United States Patent [19]
Bernstein

[11] 3,928,819
[45] Dec. 23, 1975

[54] LASER POWER SUPPLY

[75] Inventor: Daniel Bernstein, Miraleste, Calif.

[73] Assignee: The United States of America as represented by the Secretary of the Air Force, Washington, D.C.

[22] Filed: Nov. 20, 1974

[21] Appl. No.: 525,592

[52] U.S. Cl............................................ 331/94.5 PE
[51] Int. Cl.² .......................................... H01S 3/097
[58] Field of Search................. 331/94.5; 330/4.3; 328/258, 267

[56] References Cited
UNITED STATES PATENTS
3,541,420  11/1970  Rees............................ 331/94.5 PE Primary Examiner—William L. Sikes
Attorney, Agent, or Firm—Joseph E. Rusz; George Fine

[57] ABSTRACT

A laser power supply includes a regulator which has a high voltage control loop based on a linear approximation of a laser tube negative resistance characteristic. The regulator has independent control loops for laser current and power supply high voltage.

2 Claims, 2 Drawing Figures

LASER POWER SUPPLY

STATEMENT OF GOVERNMENT INTEREST

The invention described herein may be manufactured and used by or for the Government for governmental purposes without the payment of any royalty thereon.

BACKGROUND OF THE INVENTION

Current regulation for gas discharge laser tubes is usually accomplished by series ballast resistors or series current regulators. Unless the high voltage output of the laser power supply tracks the negative resistance characteristic of the tube, power supply efficiency will be lower than need be due to excessive power dissipation in the current regulator or ballast resistor.

The regulator of the present invention has a high voltage control loop which is based on a linear approximation of the laser tube negative resistance characteristic. Therefore, for any given tube known characteristics, the selection of one or two resistors will control the high voltage, as a function of laser current, such that losses across the current regulating element are minimized. For tubes with well defined characteristics, the regulator can limit dissipation in the current regulating element from 1 percent to 2 percent of the tube dissipation so that laser power supply efficiencies of 90 percent can be achieved with standard pulse width modulated DC to DC converter techniques. The regulator has independent control loops for laser current and power supply high voltage.

SUMMARY OF THE INVENTION

A laser power supply is provided having a regulator. The regulator has independent control loops for laser tube current and power supply high voltage. A novel feature of the regulator is simple high voltage and current regulation programmable by the same control signal.

DETAILED DESCRIPTION OF THE PREFERRED EMBODIMENT

Figure 1:
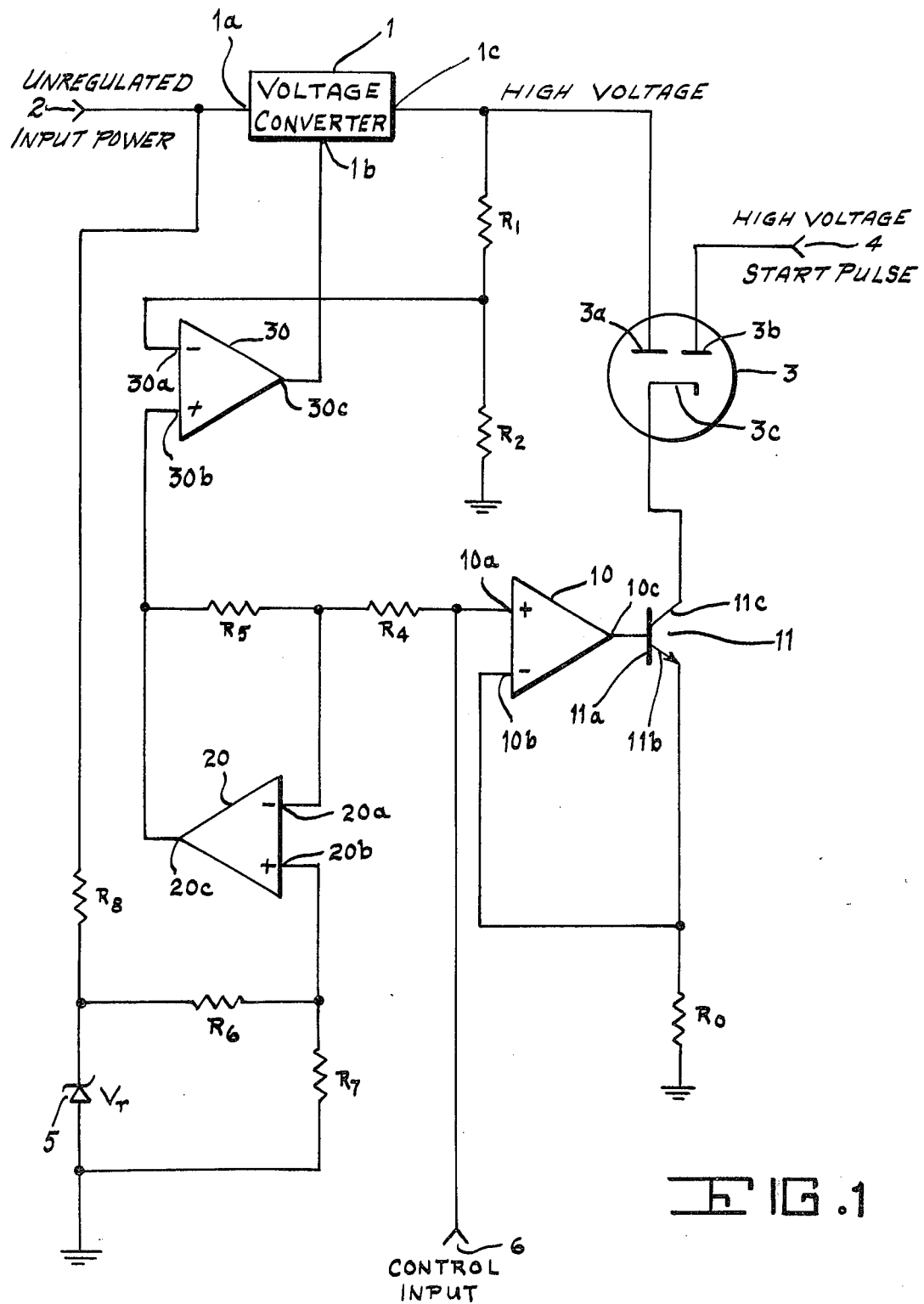
FIG. 1 of the drawings shows the preferred embodiment of the laser power supply, partly in diagrammatic and partly in block form.

Now referring in detail to FIG. 1, there is shown DC high voltage converter 1 having input terminals $1a$ and $1b$ and output terminal $1c$. Input terminal 2 receives unregulated input power for application to input terminal $1a$ of DC high voltage converter 1. A series arrangement of preselected resistors $R_1$ and $R_2$ is connected across output terminal $1c$ and ground to form a voltage divider network.

Gas discharge laser 3 includes anodes $3a$ and $3b$ and cathode $3c$. Anode $3a$ is connected to output terminal $1c$ of DC high voltage converter 1. Anode $3b$ receives a high voltage start pulse from terminal 4. Amplifier 10 includes inputs $10a$ and $10b$ and output $10c$. Input $10a$ receives a control signal from input terminal 6. Input terminal $10b$ is connected to ground by way of preselected resistor $R_o$. Output terminal $10c$ is connected to base $11a$ of emitter follower 11. Emitter $11b$ of emitter follower 11 is also connected to ground by way of preselected resistor $R_o$. Cathode $3c$ of gas discharge laser 3 is connected to collector $11c$ of emitter follower 11. Amplifier 20 has two input terminals $20a$ and $20b$ and an output terminal $20c$. Input terminal 6 is connected to input terminal $20a$ of amplifier 20 by way of resistor $R_4$. Input terminal $20b$ of amplifier 20 is connected to ground by resistor $R_7$ and to fixed reference voltage source 5 by way of resistor $R_6$. Fixed reference voltage source 5 is also connected to input terminal $1a$ of DC high voltage converter 1 by way of resistor $R_8$. Amplifier 30 includes input terminals $30a$ and $30b$ and output terminal $30c$. Input terminal $30a$ receives a voltage from the voltage divider network consisting of resistors $R_1$ and $R_2$. Input terminal $30b$ of amplifier 30 is connected to output terminal $20c$ of amplifier 20. The output voltage from amplifier 30 is fed to input terminal $1b$ of DC high voltage converter 1.

Figure 2:
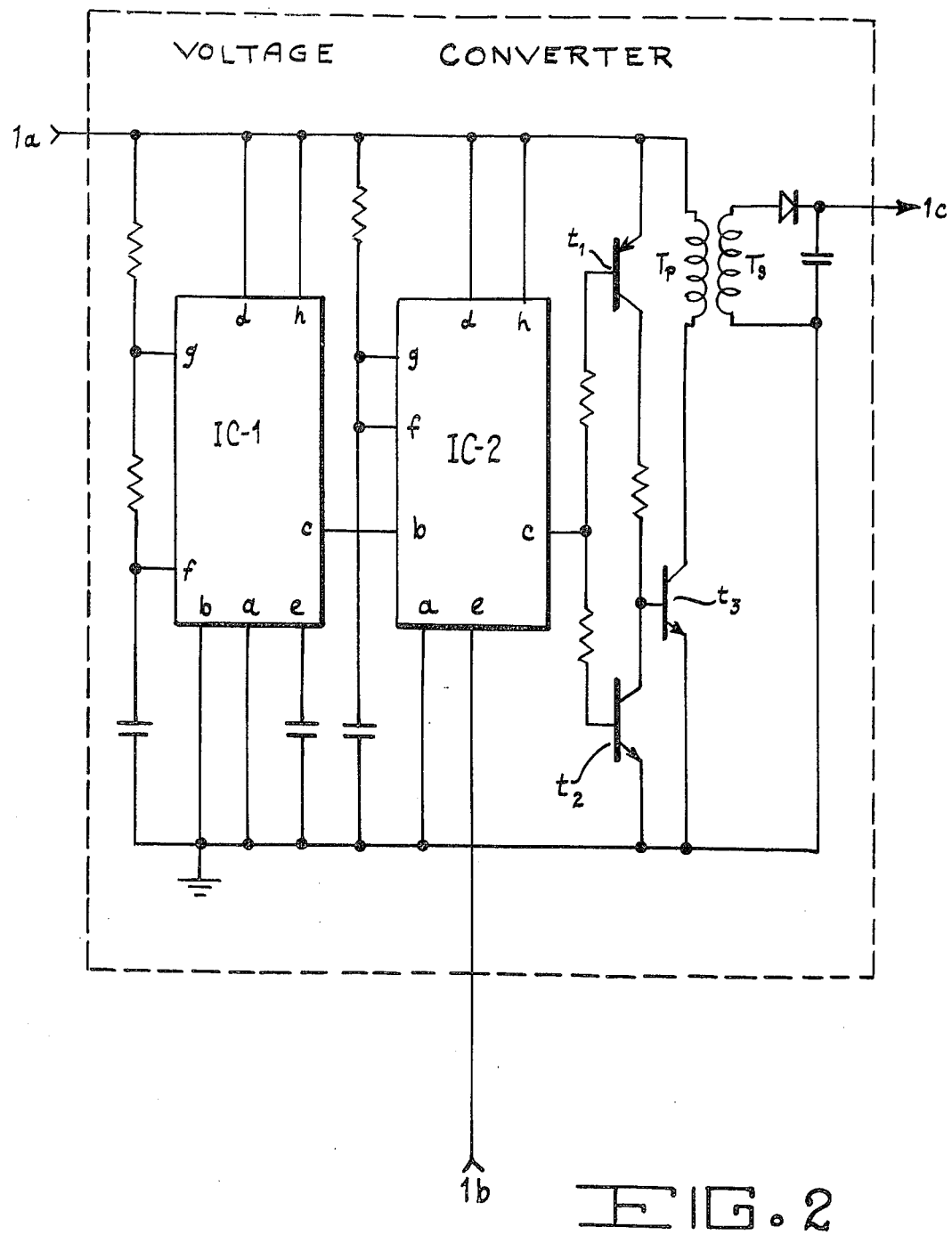
FIG. 2 shows the details of one form of the voltage converter component of FIG. 1.

Now referring to FIG. 2, there is shown one form in which voltage converter 1 may be configured. This voltage converter 1 is capable of providing a regulated output that is reduced from a pre-selected value as a function of a control input. This can be understood from the equation set out below for the regulated output voltage value when $V_c = O$ and $V_c \neq O$. Voltage converter 1 is shown to include an integrated circuit IC-1 constituting a square wave oscillator driving a second integrated circuit IC-2 configured as a pulse duration modulator. IC-1 and IC-2 may be circuit model NE/SE 555 of Signetics Corporation. The operation of these circuits are described in Signetics Corporation Application Handbook at pages 6–79 and 6–80. $a$ through $h$ in each integrated circuit IC-1 and IC-2 correspond to pin connections numbered 1–8, respectively, in the model NS/SE 555 circuit. The output of IC-2 is controlled as a function of the error signal received from line $1b$. The three transistors $t_1$, $t_2$ and $t_3$ in circuit following IC-2 function as a power amplifier driving transformer primary $T_p$. The secondary $T_s$ of the transformer feeds output power to line $1_c$ via a rectifier-capacitor filter.

In the operation of the preferred embodiment, DC high voltage converter 1 receives unregulated input power from terminal 2 and provides a high voltage of sufficient amplitude for the operation of gas discharge laser tube 3. Gas discharge laser tube 3 includes anodes $3a$, $3b$, and cathode $3c$. Gas discharge tube 3 also receives at anode $3b$ a high voltage start pulse from terminal 4.

The regulator of the power supply has independent control loops for laser current and power supply high voltage. Amplifier 10 and emitter follower 11 force the current through resistor $R_o$ to be equal to $V_c/R_o$, where $V_c$ is the laser current control voltage. Amplifier 20 provides a control voltage for the high voltage control loop equal to $V_r - V_c$, where $V_r$ is a fixed reference voltage provided by reference voltage source 5. Amplifier 30 provides an error voltage which varies the duty cycle of the pulse width modulated DC high voltage converter 1 such that the high voltage is regulated to a value equal to $(V_r - V_c)(R_1 + R_2)/R_2$ when $R_4 = R_5 = R_6 = R_7$. It is noted resistors $R_1$ and $R_2$ comprise a voltage dividing network positioned between the output of DC high voltage converter 1 and ground.

A novel feature of the regulator is simple high voltage and current regulation programmable by the same control signal received at input terminal 6. If laser current is given by $I_o = V_c/R_o$ and high voltage by $V_o = (V_r - V_c)(R_1 + R_2)/R_2$, the negative resistance characteristic of the laser (decrease in voltage as current is increased) is approximated. Scale factor and slope of the linear approximation is a function of $R_1$, $R_2$, $V_r$ and $V_c$.

What is claimed is:

1. A power supply for a gas discharge laser having first and second anodes and a cathode being comprised of a DC high voltage converter to be operated in a pulse width modulated mode and having first and second input terminals and an output terminal, said first input terminal receiving unregulated power and providing in response thereto an output of DC high voltage for application to said first anode of said gas discharge laser, first and second preselected resistors connected in a series arrangement from said output terminal to ground to form a voltage divider network, a first amplifier having an input and output and receiving at said input a control signal, an emitter follower having a base, emitter, and collector, said base being connected to said output of said first amplifier, said collector connected to said cathode of said gas discharge laser, a third preselected resistor connected between said emitter and ground, said first amplifier and emitter follower forcing current through said preselected third resistor so as to be equal to the laser current control voltage divided by the value of said third resistor, a fixed reference voltage source, a second amplifier providing a control voltage equal to the fixed reference voltage applied thereto minus said laser current control voltage, and a third amplifier receiving said control voltage and also a preselected voltage from said voltage divider network, said third amplifier providing an error voltage to said second input of said DC high voltage converter varying the duty cycle of the pulse width modulated voltage converter such that the high voltage is regulated to a value equal to the fixed reference voltage minus the laser current control voltage multiplied by the sum of said preselected first and second resistors divided by said preselected second resistor.

2. A power supply for a gas discharge laser as defined in claim 1 further including means to apply a high voltage start pulse to said gas discharge laser.

* * * * *